United States Patent Office 2,709,287
Patented May 31, 1955

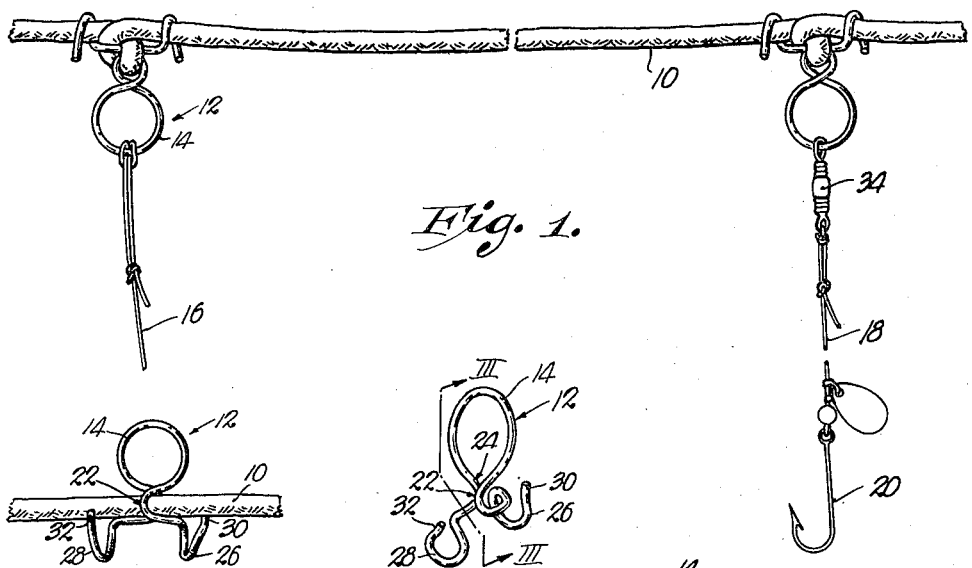

2,709,287

TROTLINE FASTENER

Malcolm C. Shelton, North Kansas City, and Walter T. Geiger, Kansas City, Mo.

Application July 2, 1952, Serial No. 296,868

3 Claims. (Cl. 24—73)

This invention relates to improvements in fishing tackle and more particularly to a novel trotline having a main line and a fastener that may be easily and readily attached and removed, the primary object being to provide a fastener adapted to receive a fish hook snell or a leader, which fastener, when properly fastened to the main line, will not shift therealong as is common in devices of this type heretofore produced.

Another object hereof is to provide a trotline fastener made entirely from a length of resilient wire, formed to present an eye in the nature of a split ring, the ends of the ring terminating in a pair of U-shaped, relatively overlapped, oppositely facing loops, the bights of the loops being so disposed as to tightly grip the trotline therebetween.

Another object hereof is to provide a fastener that includes a pair of spaced, aligned coils on the loops for receiving the line, each coil including at least one convolution and terminating in outwardly flared ends for facilitating threading of the line in the coils.

A still further object hereof is to provide a coil on one leg of each U-shaped loop respectively, the loops being disposed between the split ring or eye and the coils and the two coils in turn being spaced-apart to present a clearance for a twist or knot-like means of attachment of the line to the fastener.

Other objects include the way in which the two overlapped U-shaped loops have their legs spaced-apart to facilitate fastening; the way in which the loops are related to the eye so that the bights of the loops are movable toward and away from each other, thereby gripping the line on opposite sides thereof; the way in which the various parts are formed to permit "tying" the loops together by means of a knot or twist in the trotline itself; and many more minor objects, all of which will be made clear or become apparent as the following specification progresses, reference being had to the accompanying drawing, wherein:

Figure 1 is a side elevational view illustrating a pair of trotline fasteners made pursuant to the preferred form of our present invention attached to the trotline.

Fig. 2 is a perspective view of the preferred form of fastener entirely removed from the line.

Fig. 3 is a cross-sectional view taken on irregular line III—III of Fig. 2.

Fig. 4 is a side elevational view of the fastener showing the position of the same following the first step of application thereof to the trotline.

Figs. 5, 6, 7 and 8 are views illustrating successive steps of applying the fastener to the trotline.

Fig. 9 is a view similar to Fig. 8, showing a modified means of tying; and

Fig. 10 is a side elevational view of a slightly modified form of trotline fastener.

The fastener for a trotline 10, and embodying the preferred form of the present invention shown in Figs. 1 to 8 inclusive, is broadly designated by the numeral 12. Fastener 12 is preferably made from a single length of resilient wire or wire-like material and is bent, formed or otherwise made to present an eye 14 adapted either to receive a leader 16 or a snell 18 for hook 20 as shown in Fig. 1. The eye 14 is in the nature of a split ring and each end respectively thereof, has an open loop integral therewith. The two loops are broadly designated by the numerals 22 and 24. Loops 22 and 24 are each preferably U-shaped, presenting a pair of legs and a bight as is clearly illustrated in the drawing.

One leg of each loop 22—24 respectively, is integral with a corresponding leg of the ring 14 and coils 26 and 28 are integral with the other legs of loops 22 and 24 respectively. The loops 22 and 24 are relatively overlapped and the legs thereof are spaced-apart as shown in Fig. 3.

Coils 26 and 28 in the preferred form each consist of but a single convolution and terminate in outwardly flared ends 30 and 32 respectively. Coils 26 and 28 are in spaced alignment and the loops 22 and 24 are interposed between the ring or eye 14 and the coils 26 and 28. The spacing between the loops 22 and 24 facilitates threading of the line 10 and also permits attachment of a swivel 34, although the latter may be disposed as an interconnection between leader 16 and snell 18 if desired.

As shown in Fig. 4 of the drawing, the first step in the attachment of the fastener 12 to line 10, is to slip the line 10 between the spaced legs of the loops 22 and 24, such spacing shown in Fig. 3 of the drawing being less than the diameter of the line 10, but by virtue of the resilient nature of the fastener 12, the same will readily yield for positioning the fastener 12 on the line 10 in the manner shown by Fig. 4 of the drawing. It is now seen that the line 10 may be looped as shown in Fig. 5, line 10 being yieldably gripped on opposite sides thereof by the bights of the loops 22 and 24. To this end the normal distance between the bights of loops 22 and 24 is less than the diameter of the line 10, but here again, by virtue of the resiliency of the material from which the fastener 12 is formed, the same will readily yield to permit positioning of the line 10 between the bights of loops 22 and 24. The two ends of the line 10 shown depending from the loops 22 and 24 in Fig. 5, are thereupon twisted between the coils 26 and 28 as shown in Fig. 6 of the drawing. Following such twisting, one end of the line 10 is slipped into the coil 26 as shown in Fig. 7, the flared end 30 thereof facilitating such insertion, and here again, it is to be preferred that the flared ends 30 and 32 be spaced from the proximal end of corresponding coils 26 and 28 respectively, a distance slightly less than the diameter of the line 10. Thereupon, the other leg of the line 10 is slipped into place along the flared end 32 into the loop 28 as shown in Fig. 8 of the drawing. The space between the aligned coils 26 and 28 presents a clearing for the knot or twisted portion of the line 10. Such twisting of the line 10 in effect, ties together the two loops 22 and 24 and, with the aid of the gripping action of the bights of the loops 22 and 24 on the line 10, such twisting positively prevents slippage or movement of the fastener 12 along the trotline 10. The fasteners cannot possibly become bunched and will not slide along the line toward one end thereof where the leaders 16, snells 18 and hooks 20 become entangled as has been experienced by many fishermen.

It is recognized that many fish are lost simply because of the fact that while fighting in the water, they tend to move the trotline fasteners together, twist the leaders, thereby shortening the same and eventually tearing the hook from their mouths or breaking the leaders and escaping. Such problems are entirely eliminated through use of fastener 12 in the manner above explained.

The form of our invention shown in Fig. 10 is precisely the same as in the preferred form 12 except only that fastener 100 is provided with a pair of coils 102 and 104 having a plurality of spaced convolutions. Each coil 102—104 still is preferably provided with an outwardly flared end 106 and 108 respectively, and coils 102 and 104 are fastened to one leg of loops 110 and 112 respectively, in the same manner as in the case of fastener 12.

Loops 110 and 112 are integrally joined with a split ring eye 114 and the entire fastener 100 is preferably made from a single length of resilient wire-like material.

The attachment of the fastener 100 to a trotline follows substantially the same steps as above outlined except only following the twisting of the line, the ends thereof are wound into the coils 102 and 104 instead of being merely slipped into place as in the case of the single convolution coils 26 and 28.

While details of construction may vary from those specifically set forth herein, it is desired to be limited only by the spirit of the invention as defined by the scope of the appended claims.

The fastener 50 shown in Fig. 9 is the same as fastener 12 except only that the bights of loops 52 and 54 are in side-by-side relationship but, if desired, they may be joined; or they may be overlapped and then joined by spot weld or otherwise or left separate. The main line 56 is looped at 58 around both loops 52 and 54, twisted between coils 60 and 62 and then extended through coils 60 and 62 as shown.

Having thus described the invention what is claimed as new and desired to be secured by Letters Patent is:

1. A readily detachable, anti-slip, wire device for quickly fastening an attachment means for fish hooks to a trotline, said device comprising a ring having a single convolution provided with a pair of ends, each extending into a loop next adjacent the ring and each having a pair of legs, one leg of each loop being integral with a corresponding end of the ring, said loops opening in opposite directions and having the legs thereof relatively overlapped, presenting an eye substantially co-planar with the ring, the other leg of each loop terminating in an integral coil, the loops being separate for receiving the trotline therebetween in the initial placement of the trotline into the eye, said coils being spaced-apart to clear a twist in the trotline formed after placement of the same into the eye, and each coil having at least one complete convolution, open to receive the trotline after formation of said twist, and to permit threading of said attachment means, first into one of the coils, thence into one of the loops and finally into the ring, all prior to fastening the device on the trotline, said coils having aligned axes lying substantially in a plane containing the ring and the eye, whereby the stretches of the trotline which extend through the coils remain substantially straight and aligned.

2. The invention as set forth in claim 1 wherein the coils both loop over the trotline when the ring is disposed therebelow, whereby to prevent their being pulled off the trotline when a pull is exerted on said attachment means.

3. The invention as set forth in claim 1 wherein the coils are wound in opposite directions and both loop over the trotline when the ring is disposed therebelow, whereby to prevent their being pulled off the trotline when a pull is exerted on said attachment means.

References Cited in the file of this patent

UNITED STATES PATENTS

| | | |
|---|---|---|
| 372,686 | Lester | Nov. 8, 1887 |
| 475,589 | Mills | May 24, 1892 |
| 1,232,527 | Gemmill | July 10, 1917 |